United States Patent
Holtmanns et al.

(10) Patent No.: US 9,547,759 B2
(45) Date of Patent: Jan. 17, 2017

(54) METHOD AND APPARATUS FOR MANAGING USER PROVIDED ACCESS TOKENS

(71) Applicant: Nokia Corporation, Espoo (FI)

(72) Inventors: Silke Holtmanns, Klaukkala (FI); Rune Lindholm, Sottunga (FI)

(73) Assignee: Nokia Technology Oy, Espoo (FI)

( * ) Notice: Subject to any disclaimer, the term of this patent is extended or adjusted under 35 U.S.C. 154(b) by 0 days.

(21) Appl. No.: 14/358,648

(22) PCT Filed: Oct. 31, 2012

(86) PCT No.: PCT/FI2012/051056
§ 371 (c)(1),
(2) Date: May 15, 2014

(87) PCT Pub. No.: WO2013/079775
PCT Pub. Date: Jun. 6, 2013

(65) Prior Publication Data
US 2015/0007348 A1 Jan. 1, 2015

(30) Foreign Application Priority Data
Nov. 28, 2011 (GB) .................................. 1120445.0

(51) Int. Cl.
*G06F 21/31* (2013.01)
*H04W 4/00* (2009.01)
(Continued)

(52) U.S. Cl.
CPC .............. *G06F 21/31* (2013.01); *G06F 21/45* (2013.01); *H04L 63/083* (2013.01); *H04W 4/001* (2013.01); *H04W 4/003* (2013.01); *H04W 12/06* (2013.01)

(58) Field of Classification Search
CPC ...... H04W 4/003; H04W 12/06; H04W 4/001; H04L 63/083; G06F 21/31; G06F 21/45
(Continued)

(56) References Cited

U.S. PATENT DOCUMENTS

2005/0006461 A1 1/2005 Shenker et al.
2006/0031493 A1 2/2006 Cugi
(Continued)

FOREIGN PATENT DOCUMENTS

EP 1770534 4/2007
WO 9843212 10/1998
(Continued)

OTHER PUBLICATIONS

"Smart Cards; UICC-Terminal Interface; Physical and Logical Characteristics (Release 8)", ETSI TS 102 221, V8.2.0, Jun. 2009, pp. 1-174.
(Continued)

*Primary Examiner* — Baotran N To
(74) *Attorney, Agent, or Firm* — Mintz Levin Cohn Ferris Glovsky and Popeo, P.C.

(57) ABSTRACT

A method comprises receiving an additional user provided access token requesting application at a device already having a user provided access token requesting application. The method also comprises requesting information from a user of said device if an access token of one of said applications is to be changed to that of the other of said applications and accepting verification by one of said applications as verification of another of said applications.

22 Claims, 4 Drawing Sheets

(51) Int. Cl.
*H04W 12/06* (2009.01)
*G06F 21/45* (2013.01)
*H04L 29/06* (2006.01)

(58) Field of Classification Search
USPC .......................................................... 726/28
See application file for complete search history.

(56) References Cited

U.S. PATENT DOCUMENTS

| | | | |
|---|---|---|---|
| 2007/0169188 A1* | 7/2007 | Hollingsworth | G06F 21/41 726/17 |
| 2009/0215489 A1 | 8/2009 | Kerdraon et al. | |
| 2009/0270072 A1 | 10/2009 | Hsu et al. | |
| 2010/0287596 A1 | 11/2010 | Yasuho et al. | |
| 2011/0093947 A1* | 4/2011 | Kato et al. | 726/16 |
| 2011/0105081 A1 | 5/2011 | Park et al. | |

FOREIGN PATENT DOCUMENTS

| | | |
|---|---|---|
| WO | 03/104952 A2 | 12/2003 |
| WO | 2007/067349 A1 | 6/2007 |
| WO | 2007096723 | 8/2007 |

OTHER PUBLICATIONS

"Identification Cards—Integrated Circuit Cards", Part 4: Organization, security and commands for interchange, ISO/IEC 7816-4, Jan. 15, 2005, 90 Pages.

"Identification cards—Integrated Circuit Cards", Part 8: Commands for security operations, ISO/IEC 7816-8, Jun. 1, 2004, 06 Pages.

International Search Report and Written Opinion received for corresponding Patent Cooperation Treaty Application No. PCT/FI2012/051056, dated Feb. 13, 2013, 12 pages.

Extended European Search Report received for corresponding European Patent Application No. 12853186.0, dated Jul. 3, 2015, 6 pages.

"How to Enable Ipad to Remember Password While Installing Apps", Digital Answers—A Beginners Guide, Retrieved on Jul. 15, 2015, Webpage available at : http://blogmines.com/blog/how-to-enable-ipad-to-remember-password-while-installing-apps/.

"Android Market Trumps Apple's App Store With Auto-Update Feature", PCWorld, Retrieved on Jul. 15, 2015, Webpage available at: http://www.pcworld.com/article/243006/android_market_trumps_app_store_with_auto_updates.html.

* cited by examiner

METHOD AND APPARATUS FOR MANAGING USER PROVIDED ACCESS TOKENS

RELATED APPLICATION

This application was originally filed as PCT Application No. PCT/FI2012/051056 filed Oct. 31, 2012, which claims priority benefit from United Kingdom Application No. 1120445.0, filed Nov. 28, 2011.

The invention relates to a method and apparatus and in particular to a method and apparatus for use with user provided access token requesting applications.

A communication system enables communication between two or more communication devices such as user terminals, base stations and/or other nodes by providing carriers between the communication devices. In a wireless communication system at least a part of communications between at least two stations occurs over wireless interfaces. A user can access a communication system by means of an appropriate communication device or terminal. A communication device is provided with an appropriate signal receiving and transmitting apparatus for enabling communications, for example enabling access to a communication network or communications directly with other users. The communication device may access one or several carriers provided by a station, for example a base station of a cell, and transmit and/or receive communications on the carriers.

It has been proposed to have a communication device which has two SIM cards.

According to an aspect there is provided a method comprising: receiving an additional user provided access token requesting application at a device already having a user provided access token requesting application; requesting information from a user of said device if an access token of one of said applications is to be changed to that of the other of said applications; and accepting verification by one of said applications as verification of another of said applications. The method may comprise responsive to information from said user, changing the access token of said one application to that of said other application.

According to an aspect there is provided a method comprising: receiving an additional user provided access token requesting application at a device already having a user provided access token requesting application, said additional application being associated with a different source to said already provided application; requesting information from a user of said device if an access token of one of said applications is to be changed to that of the other of said applications; and responsive to information from said user, changing the access token of said one application to that of said other application.

The method may comprise accepting verification by one of said applications as verification of another of said applications.

One or more the above methods may comprise assigning a verification key associated with a respective access token to the application for which the user provided access token has been changed.

One or more the above methods may comprise determining the presence of said additional application.

One or more the above methods may comprise determining by a user provided access token management entity the presence of the already provided application.

In one or more the above methods, the requesting may comprise requesting information from said user of said device if said user provided access token of said additional application is to be changed to that of the already provided application.

In one or more the above methods, one or more of said applications may be provided on a universal integrated circuit card, integrated circuit or an embedded integrated circuit.

In one or more the above methods, at least one of the applications may reside in a non-removable element In one or more the above methods, receiving said additional application may comprises downloading said additional application.

In one or more the above methods, receiving said additional application may comprise providing a physical element carrying said additional application.

In one or more the above methods, at least one of the applications may reside in a removable element.

In one or more the above methods, at least one of said applications may comprise a subscriber identification module, universal subscriber identification module, an internet protocol subscriber identification module, a code division multiple access subscriber identification module and a removable user identity module.

In one or more the above methods, at least one of said applications may comprise a network access application.

In one or more the above methods, said access token may comprise a personal identification number and/or password.

In one or more the above methods, said requesting may comprise at least one of displaying a message and causing an audible message.

According to an aspect there is provided a method comprising: causing a query to be sent to a device requesting information about one or more user provided access tokens used on said device, assigning in dependence on a response received to said query, a user provided access token to a user provided access token requesting application; and causing said user provided access token requesting application to be sent to said device.

According to an aspect there is provided a method comprising: receiving at a device, a query requesting information about one or more user provided access tokens used on said device, sending a response to said query, said response comprising information about said user provided access token; and receiving a user provided access token requesting application having a user provided access token which is the same as one of said one or more user provided access tokens.

According to an aspect there is provided apparatus comprising: means for receiving an additional user provided access token requesting application at a device already having a user provided access token requesting application; means for requesting information from a user of said device if an access token of one of said applications is to be changed to that of the other of said applications; and means for accepting verification by one of said applications as verification of another of said applications.

The apparatus may comprise means responsive to information from said user, for changing the access token of said one application to that of said other application.

According to an aspect there is provided a apparatus comprising: means for receiving an additional user provided access token requesting application at a device already having a user provided access token requesting application, said additional application being associated with a different source to said already provided application; means for requesting information from a user of said device if an access token of one of said applications is to be changed to that of the other of said applications; and means, responsive to information from said user, for changing the access token of said one application to that of said other application.

The apparatus may comprise means for accepting verification by one of said applications as verification of the other of said applications In one or more of the above apparatus, the apparatus may comprise means for assigning a verification key associated with a respective access token to the application for which the user provided access token has been changed.

In one or more of the above apparatus, the apparatus may comprise means for determining the presence of said additional application.

In one or more of the above apparatus, the apparatus may comprise a user provided access token management entity for determining the presence of the already provided application.

In one or more of the above apparatus, said requesting means may be arranged to request information from said user of said device if said user provided access token of said additional application is to be changed to that of the already provided application.

In one or more of the above apparatus, the apparatus may comprise at least one of a universal integrated circuit card, integrated circuit or an embedded integrated circuit on which one or more of said applications is provided.

In one or more of the above apparatus, the apparatus may comprise a non-removable element in which at least one of the applications resides.

In one or more of the above apparatus, the means for receiving may comprise means for downloading said additional application.

In one or more of the above apparatus, said receiving means may be configured to receive a physical element carrying said additional application.

In one or more of the above apparatus, the apparatus may comprise a removable device in which at least one of the applications resides.

In one or more of the above apparatus, at least one of said applications may be provided on at least one of a subscriber identification module, universal subscriber identification module, an internet protocol subscriber identification module, a code division multiple access subscriber identification module and a removable user identity module.

In one or more of the above apparatus, at least one of said applications may comprise a network access application.

In one or more of the above apparatus, said access token may comprise a personal identification number and/or password.

In one or more of the above apparatus, said requesting means may be arranged to at least one of display a message and cause an audible message.

According to an aspect there is provided apparatus comprising: means for receiving at a device, a query requesting information about one or more user provided access tokens used on said device, means for sending a response to said query having information about said user provided access token; and means for receiving a user provided access token requesting application having a user provided access token which is the same as one of said one or more user access tokens.

According to an aspect there is provided apparatus comprising: at least one processor and at least one memory including computer program code, wherein the at least one memory and computer program code are configured to, with the at least one processor, cause the apparatus to: receive an additional user provided access token requesting application at a device already having a user provided access token requesting application; request information from a user of said device if an access token of one of said applications is to be changed to that of the other of said applications; and accept verification by one of said applications as verification of another of said applications According to an aspect there is provided apparatus comprising: at least one processor and at least one memory including computer program code, wherein the at least one memory and computer program code are configured to, with the at least one processor, cause the apparatus to: receive an additional user provided access token requesting application at a device already having a user provided access token requesting application, said additional application being associated with a different source to said already provided application; request information from a user of said device if an access token of one of said applications is to be changed to that of the other of said applications; and responsive to information from said user, change the access token of said one application to that of said other application.

According to an aspect there is provided apparatus comprising: at least one processor and at least one memory including computer program code, wherein the at least one memory and computer program code are configured to, with the at least one processor, cause the apparatus to: receive at a device, a query requesting information about one or more user provided access tokens used on said device; send a response to said query having information about said user provided access token; and receive a user provided access token requesting application having a user provided access token which is the same as one of said one or more user access tokens.

According to an aspect there is provided apparatus comprising: means for causing a query to be sent to a device requesting information about one or more user provided access tokens used on said device; means for assigning in dependence on a response received to said query, a user provided access token to a user provided access token requesting application; and means for causing said user provided access token requesting application to be sent to said device.

According to an aspect there is provided an apparatus comprising: at least one processor and at least one memory including computer program code, wherein the at least one memory and computer program code are configured to, with the at least one processor, cause the apparatus to: cause a query to be sent to a device requesting information about one or more user provided access tokens used on said device; assign in dependence on a response received to said query, a user provided access token to a user provided access token requesting application; and cause said user provided access token requesting application to be sent to said device.

Embodiments will now be described in further detail, by way of example only, with reference to the following examples and accompanying drawings, in which.

In the following certain exemplifying embodiments are explained with reference to a wireless communication system serving devices adapted for wireless communication. Therefore, before explaining in detail the exemplifying embodiments, certain general principles of a wireless system, components thereof, and devices for wireless communication are briefly explained with reference to system 10 of FIG. 1, and communications device 20 of FIG. 2 to assist in understanding the technology underlying the described examples.

A communication device can be used for accessing various services and/or applications provided via communication systems. In wireless or mobile communication systems the access is provided via a radio module instance of the wireless access interface between mobile communication devices and an appropriate access system. A communication device may access wirelessly a communication system via a base station. The base station may be a macro, micro, femto (Home (e) Node base station) or pico base station.

Figure 1:
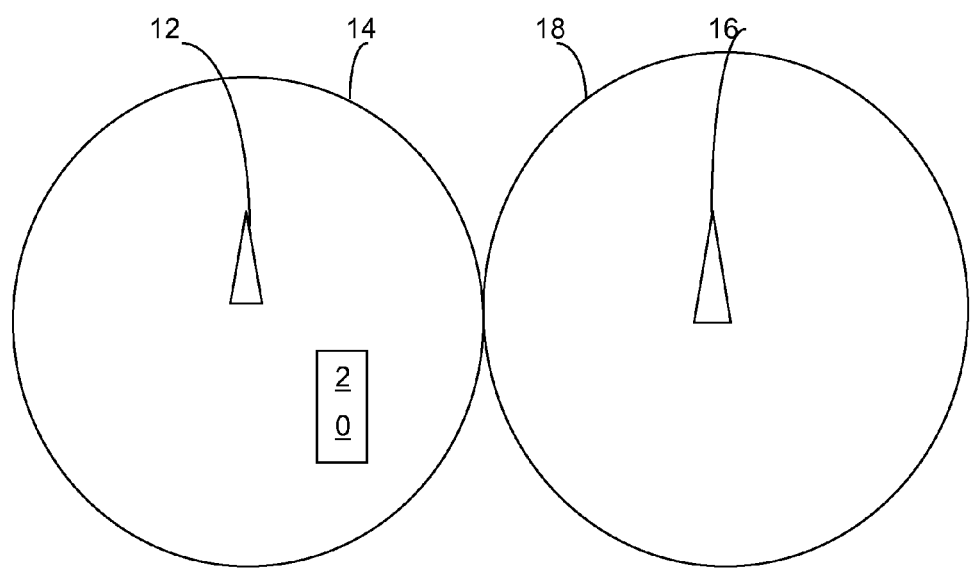
FIG. 1 shows an example of a system wherein below described embodiments may be implemented.

FIG. 1 shows by way of example a first base station 12 providing a first cell 14 and a second base station 16 providing a second cell 18. This is a simplified version of the network. In practice a base station can provide more than one cells. There may also be base stations arranged to have cells overlying at least partially other cells. Of course in practice more than two base stations may be provided. An enabled terminal may connect to more than one network and base station.

Also shown in FIG. 1 is a communication device 20 in the cell 14 associated with the first base station. The communication device 20 and base station may have one or more radio channels open at the same time and may receive signals from more than one source or network operator.

An example of a standardized architecture is known as the long-term evolution (LTE) of the Universal Mobile Telecommunications System (UMTS) radio-access technology. The LTE is being standardized by the 3rd Generation Partnership Project (3GPP). The various development stages of the 3GPP LTE specifications are referred to as releases. A development of the LTE is often referred to as LTE-Advanced (LTE-A). Many markets move forward to utilize this technology and develop their own customized version of the technology by means of local standards e.g. China.

A communication device can access a communication system based on various access techniques, such as code division multiple access (CDMA), or wideband CDMA (WCDMA). The latter technique is used by communication systems based on the third Generation Partnership Project (3GPP) specifications and in some of the standardization in China. Other examples include time division multiple access (TDMA), frequency division multiple access (FDMA), space division multiple access (SDMA) or orthogonal frequency division multiple (OFDMA).

Figure 2:
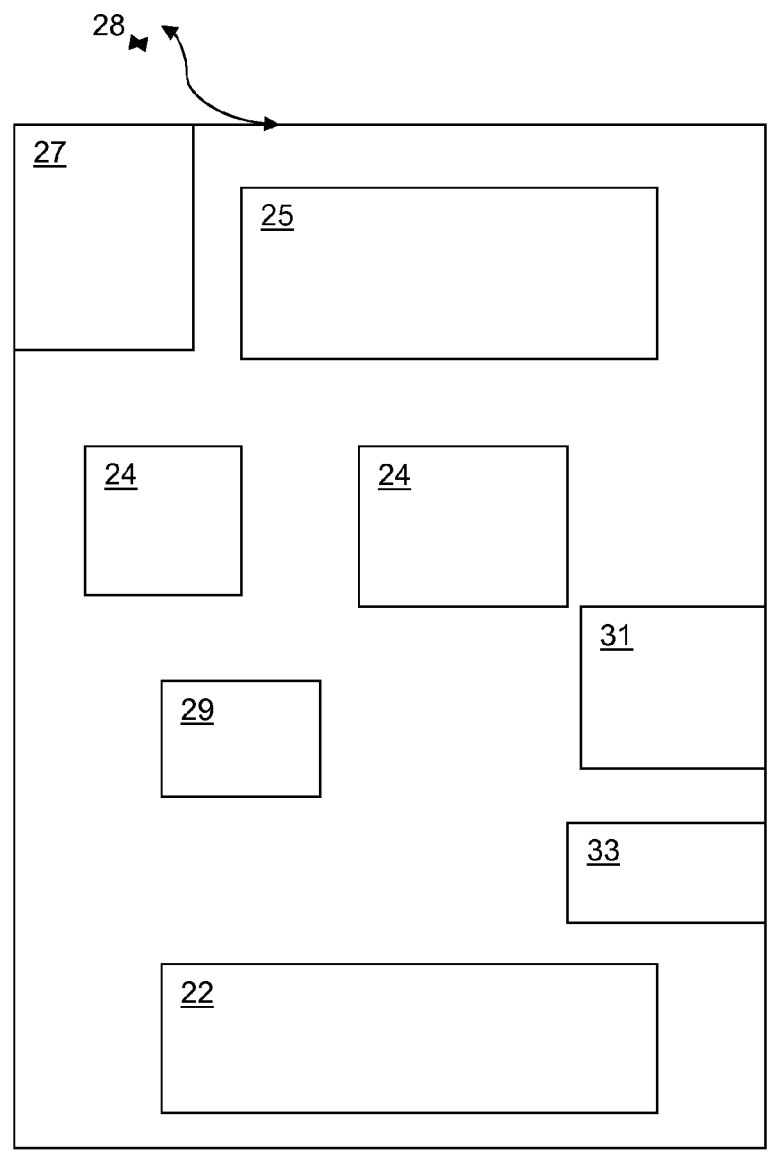
FIG. 2 shows an example of a communication device

FIG. 2 shows a schematic, view of a communication device 20 that a user can use for communications. Such a communication device is often referred to as user equipment (UE) or terminal. The communication device may be mobile or have a generally fixed location. The device might be a consumer product like a cellular phone or any other device enabled with cellular capability (smart device or device-to-device communication). An appropriate communication device may be provided by any device capable of sending and receiving radio signals. Non-limiting examples include a mobile station (MS) such as a mobile phone or what is known as a 'smart phone', a portable computer provided with a wireless interface card or other wireless interface facility, personal data assistant (PDA) provided with wireless communication capabilities or a tablet or laptop with one or more wireless modems, or any combinations of these or the like. A communication device may provide, for example, communication of data for carrying communications such as voice, electronic mail (email), text message, multimedia, positioning data, other data, and so on. Users may thus be offered and provided numerous services via their communication devices. Non-limiting examples of these services include two-way or multi-way calls, data communication or multimedia services or simply an access to a data communications network system, such as the Internet.

A communication device is typically provided with at least one data processing entity 23, at least one memory 24 and other possible components 29 for use in software and hardware aided execution of tasks it is designed to perform, including control of access to and communications with base stations and other communication devices.

A device with a suitable radio chip can access two or more networks at the same time. Some chips may have more than one radio module instance of the wireless access interface The user may control the operation of the communication device by means of a suitable user interface such as key pad 22, voice commands, touch sensitive screen or pad, combinations thereof or the like. A display 25, a speaker and a microphone are also typically provided. Furthermore, a communication device may comprise appropriate connectors (either wired or wireless) to other devices and/or for connecting external accessories, for example hands-free equipment, thereto.

Embodiments may also be used with other devices which may not be considered to be "communication devices" as such but which are required to communicate with another entity to provide and/or receive data or the like. Some alternative embodiments provide a device other than a phone or the like where automatic alignment systems are of use to reduce the need for direct service personal interaction with the device. For some of these devices, the user interface might be simplified or be more limited i.e. only some of the human-to-device interfaces mentioned above are available directly as service interfaces, other interfaces might only be available via remote connection.

The device 20 may receive and transmit signals 28 via appropriate apparatus for receiving and transmitting signals. In FIG. 2 transceiver apparatus is designated schematically by block 27. The transceiver apparatus is provided with radio capability. The transceiver may be provided for example by means of a radio part and associated antenna arrangement. The antenna arrangement may be arranged internally or externally to the mobile device.

Embodiments may provide a device having set of access credentials. The set may comprise two or more access credentials. Examples of access credentials may be SIM (subscriber identification module) cards, USIM (universal subscriber identification module) applications on UICC (Universal Integrated Circuit Card) cards, and/or an embedded chip which holds the access credentials and related information and applications.

For example, a first SIM card 31 is provided along with a second SIM card 33. In some embodiments, these SIM cards may be provided by physical cards and in other embodiments, these SIM cards may be software. Of course in some embodiments, the one SIM card may be provide a physical card and one SIM card may be provided by software. In some embodiments one or more of the SIMs may be an application in a Universal Integrated Circuit Card (UICC). The UICC may be a smart card, embedded circuit or any other secure data store which is responsible for holding security related data.). This card may be an embedded chip or removable card.

In alternative embodiments, any other suitable secure data store may be used instead of the UICC. The term SIM card describes a secure module that may hold one or several network access applications (NAA) which contain cryptographic keys and related network data. Examples of such applications are SIM, USIM, IP Multimedia Subsystem SIM (ISIM), CDMA SIM (C-SIM), removable user identity module (R-UIM). The SIM card may also contain other applications that require entering of a personal identification number (PIN), for example banking applications.

It should be noted that the first and second SIM cards shown in FIG. 2 may not be present and instead the first and second SIMs may be applications stored in a UICC or other secure data store.

The UICC or secure data store may have more than one application making it possible for example to access different types of network and/or the same type of network operated by different operators. In some embodiments there may be one UICC. In alternative embodiments there may be two or more UICCs in one device and each of them holding NAA for different network operators.

Some embodiments relate to PIN management. In some embodiments, there may be two or more applications which have different PIN numbers. Two or more applications may be owned/controlled or provided by different owners. By way of example this may be the case where a single communications device has two or more cards in the device requiring a PIN. The different applications may be associated with one or more a different subscription, and payment application.

In some embodiments, a user has a device that is capable of handling two or more subscriptions. This may be by means of one or more slots for SIM cards and/or by downloading one or more subscriptions. The user may use different subscriptions at different times for example to save data roaming charges or obtain best coverage and service. Since the origin of those applications differs the user has to remember several different PINs or configure his device manually to have the same PINs. In some embodiments the user is assisted to harmonize the PIN management to avoid blocking applications by wrong PIN insertions. The technical aspects and details of the harmonization and variants for different areas and use cases are described.

When the user downloads or receives otherwise a new application (e.g. USIM of a different operator) to his communications device, a user is required to set a new PIN.

The new application may be a e.g. USIM on an additional SIM card

The new application may be of a different operator to that currently being used by the communication device.

The new application may be downloaded to a secure element of the device. One example of a secure element is an embedded UICC (eUICC) of the communications device.

It is undesirable that a user has to remember and manage two or more PINs or is forced to find a way to configure them to a common value manually. Embodiments may not require a user to insert the PIN for each application at start-up of the device. It would be difficult for example to insert three different PINs in the right order before one phone call could be made. In some embodiments, a user would want to remember only one PIN or perhaps only two or three (if wanted).

The concept of a universal PIN idea has been proposed in ETSI standard TS 102 221 and ISO standards, 7816-4 and 7816-8. However the inventors have appreciated that it cannot be assumed that those applications requiring the PINs come only from one source. Therefore, the basic concept of a universal PIN cannot be straightforwardly applied at the source of the application. In some embodiments, this is dealt with at the terminal.

Some embodiments provide a method for using a common PIN in the case that a user has downloaded a new subscription/application into the communications device.

Embodiments may be used where a communications device has at least one secure module or element. This secure module or element maybe a removable or non-removable part of the communications device. Alternatively or additionally the secure module or element may be provided as part of the modem implementation. This secure module may be a SIM card, a UICC or other secure data store. The security module may have processing capability associated there with.

In some embodiments, there may be two or more applications. Each of these applications requires a PIN. Whilst PIN management is described by way of example, it should be appreciated that some embodiments may alternatively or additionally use passwords or other access tokens.

At least two different applications which require a PIN are associated with different security entities. By way of example, a security entity comprises any of the following: Mobile network operator, bank, public transport provider, payment provider or the like.

For example, one application may be associated with one network operator and another application may be associated with a different network operator. In another example, one application is associated with a network operator and another application may be associated with a bank. It should be noted, that these scenarios are only two of a large number of possible scenarios. Different applications may be associated with any two or more different security entities.

The security entity will be one which will communicate with the communications device directly or indirectly. For example a base station of a network operator may be arranged to communicate with the communication device. In another example a bank may communicate with the communications device via a communications infrastructure.

The security entity will have an interaction with the communications device where there is potentially some security or verification procedure required in order to authenticate, validate or permit a communications device to perform some function. That function may be to make a call, make a transaction or any other suitable function.

In embodiments, the application to be down loaded has no default PIN assigned. This is because the default PIN could collide with another application on the secure module having assigned the same key reference to its PIN. However, in practice it may be that most applications come with a predefined PIN that is changeable.

Figure 3:
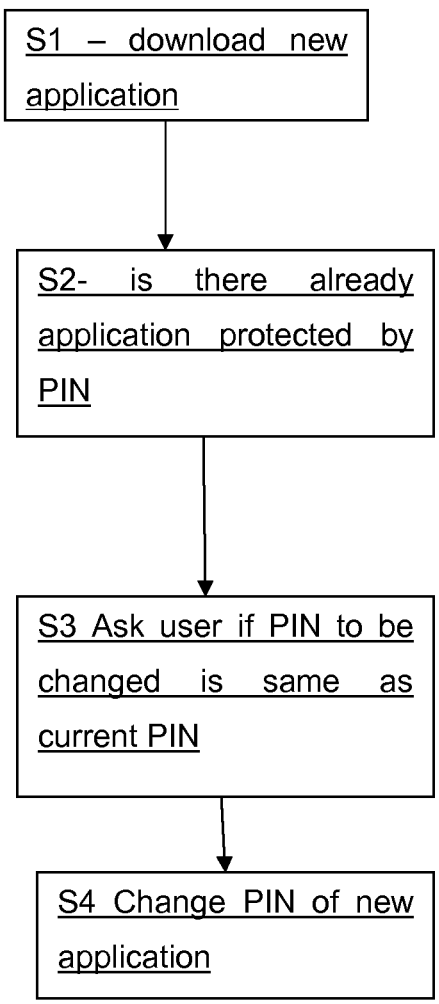
FIG. 3 shows a first method.

Reference is made to FIG. 3 which shows a first method of an embodiment.

In step S1, the user receives a new subscription/application to the device, which may hold a eUICC. The subscription may be a NAA or any other suitable application. In one embodiment, the user goes into a shop and buys a secondary SIM card. In another embodiment, the user downloads a software based NAA or application to his device from a service provider or directly from the operator.

In step S2, a PIN management entity or function (which can be part of modem or part of a UICC management profile or any other suitable entity) notes that there already exist a subscription that is protected by a PIN. In one embodiment, the user plugs in this new card and the devices notes that there is already a SIM card and was not there before (i.e. the device has memorized previous subscriptions) and that it should harmonize the PINs. In another embodiment, the device notice that it has now at least two subscriptions/applications requiring PIN entry and one is new.

An alternative method to achieve the same PIN value on a smart card having two or more applications, UICC or eUICC is where the entity that is preparing the profile to be downloaded queries the entity to which the application is to be downloaded. That entity to which the application is to be downloaded may be a smart card, UICC or eUICC. The entity which is preparing the profile to be downloaded will query the entity to which the application is to be downloaded for the PIN key identifiers are being used in the device and will assign the same key identifiers to the application prior to it being down loaded. This application will then automatically accept the same PIN value as those already installed on the smart card, UICC or eUICC.

In step S3 the user is prompted if he wishes to set the PIN for the new subscription (application) to the same value as the old subscription (application). There may be situations where certain applications may want to retain a dedicated PIN. The reason being that once the PIN is verified it opens access to these applications as well, although they may not currently be in use. If there are several subscriptions with different PINs then a choice is offered. The choice contains the application information for the different applications using different PINs and potentially the clear-text PIN. It should be noted that the clear text Pin may not available in some embodiments due to security risks of shoulder surfing.

In step S4, when the user has made the choice, the PIN for the downloaded application will be changed. The PIN management will assign the same verification key identifier to this application as the selected PIN indicates. There may be several ways to find out which key identifier belongs to a PIN. The key identifiers used in an application can be read from the File Control Parameters or similar files when the application is selected.

Figure 4:
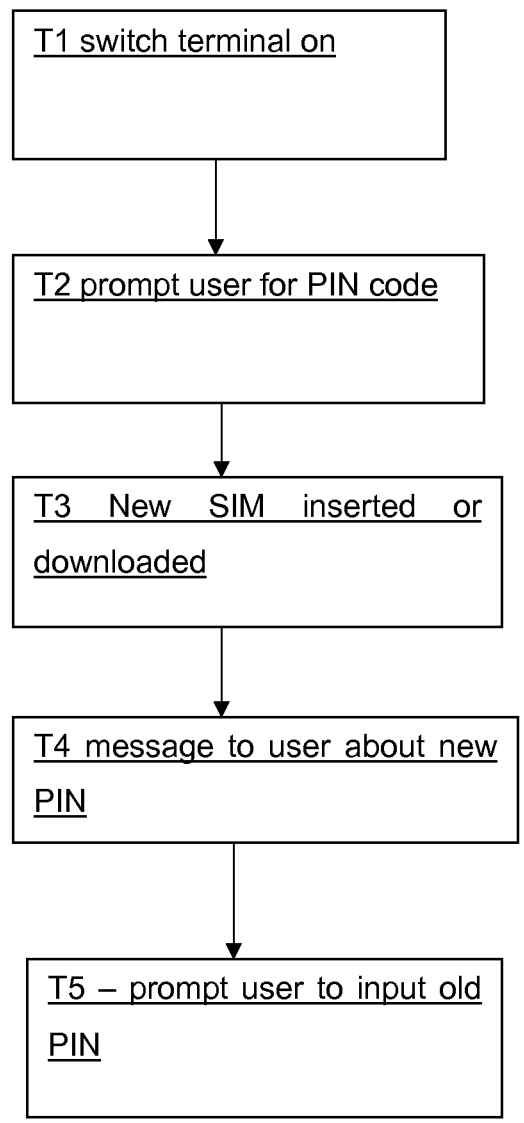
FIG. 4 shows a second method.

Another method where there is a dual or multi SIM or the like is now described with reference to FIG. 4. Upon switching on the multi-SIM device the user is only prompted once for a PIN (not several times as with current dual-SIM devices) if all applications have been assigned the same PIN (key reference). Usability of multi-SIM phones is increased. There are dual SIM, triple SIM and quad SIM phones on the market. With the outlined approach it will not happen so often that an application is locked due to a forgotten PIN or wrong order of PIN entry. The start-up time of the device may be improved In step T1, the dual SIM mobile terminal is powered on.

In step T2, if PIN code protection function of a SIM card or UICC inserted into the slots is activated, then the terminal shall prompt the user to input the PIN code.

Embodiment may reduce user errors for false PIN entries to avoid blocking the SIM cards. In step T3, the terminal recognizes if a new SIM card is inserted or downloaded, that is a SIM card which has not previously been used with this terminal.

In step T4, the user is then prompted if he would like to have the same PIN for both or several cards. The user is also asked which PIN should be the new PIN. This may be done by means of a message being displayed or by the communications device providing an audio output e.g. do you want to use the PIN of your old SIM1 also for your new SIM2?

If the user indicates yes by any suitable input (keypad, touch screen, voice or the like) then the user is prompted in any suitable way to enter the old PIN to confirm the change for the new card. The prompt and response required by the communications device may depend on protection settings associated with the SIM card in question.

Upon switching on the terminal the next time with the same cards, the user would only need to enter one PIN which would be distributed by the terminal to all cards and associated applications. The cards do not need to be in the same slots as before, they may also switch. Applying this to two or more smart cards requires a list of key identifiers and UICC IDs to be stored in the terminal. The fact that the key identifiers on different card have the same value does not mean that they have the same PIN value. On the same smart card or embedded secure element this is generally the case. This means that in a multiple card situation changing the key identifier may not imply that the PIN values will be the same, the terminal may not assume that they are the same even if the key identifier are the same. This might be the case with multiple UICCs with one USM application.

If the information in the card protected by a PIN code needs to be read, and the PIN code has not be checked before, then the terminal will initiate the relevant prompting messages to tell the user to input the PIN code. This prompt may lead to the steps T4 and step T5 being carried out.

It should be appreciated that in some embodiments, step T5 may take place before T4.

In some embodiments, the communications device may be such that the user does not select which PIN to use but the first used PIN is selected to be the common PIN.

A subscription in some embodiments may be used is used to describe an operator profile or application e.g. CSIM (CDMA SIM), USIM, ISIM (IP Multimedia Subsystem SIM), R-UIM (removable user identity module), SIM or a combination of those. The operator profile or application might be stored on a removable secure element (UICC, secure data card) or non-removable eUICC. Any combination of the above is also possible.

Currently there is a configuration and usability issue where there is a plurality of PINs associated with a single device. Network operators generally require their SIMs even if only software is to be protected with PINs. SIM-PINs may have 4 digits.

Some embodiments allow this single PIN to be set in an easy manner without bothering the user and within the limits which are set by an operator.

This happens during download of a software SIM or PIN-requesting application or after the insertion of a physical SIM.

There might be phones that provide one or several slots for physical SIM card and an additional mechanism to download software based SIM.

There may be a separate PIN for UICC application, even for a software based SIM implementation. In embodiments, one SIM or SIM application will accepts the verification done by another application. One UICC card may contain several network access applications. For example a UICC card may contain a SIM USIM and ISIM application and those may be protected by different PINs. In one embodiment, the PIN verification done by one of those applications is sufficient for the others to start up i.e. they share the same PIN key identifier and only one PIN entry is required.

As outlined before, a 4 digit PIN is one method requested from the user, However alternatively or additionally some embodiments may use more or less than a four digit pin, a password and/or other user provided access token.

A SIM card with one network access application is the one simple case. However there are more complex cases, for example a UICC card may contain several PIN requesting applications.

Embodiments may be used with any suitable term user provided access token requesting application.

It should be appreciated that the embodiments may be implemented by one or more computer programs running on one or more processors, hardware, firmware, dedicated circuits or any combinations of two or more of the above. Some embodiments may make use of one or more memories. For example the computer programs may comprise computer executable instructions which may be stored in one or more memories. When run, the computer program(s) may use data which is stored in one or more memories. The security module may comprise at least some memory and/or at least some processing function which may be perform some of the steps of the methods.

It is noted that whilst embodiments have been described in relation to certain architectures, similar principles can be applied to other communication systems Therefore, although certain embodiments were described above by way of example with reference to certain exemplifying architectures for wireless networks, technologies and standards, embodiments may be applied to any other suitable forms of communication systems than those illustrated and described herein. It is also noted that different combinations of different embodiments are possible. It is also noted herein that while the above describes exemplifying embodiments of the invention, there are several variations and modifications which may be made to the disclosed solution without departing from the spirit and scope of the present invention.

The invention claimed is:

1. An apparatus comprising:
at least one processor and at least one memory including computer program code, the at least one memory and the including computer program code configured to, with the at least one processor, cause the apparatus to at least:
store, at the apparatus, a first user provided access token requesting application, wherein the first user provided access token requesting application is associated with an existing access token;
receive a second user provided access token requesting application;
request, from a user of the apparatus, information indicative of whether an access token of the second user provided access token requesting application is to be changed to the existing access token or to different access token; and
use the access token of the second user provided access token requesting application for verification, wherein the access token of the second user provided access token requesting application is changed, based on information provided by the user, to the existing access token or the different access token.

2. The apparatus as claimed in claim 1, wherein a verification of the first user provided access token requesting application is accepted as a verification of the second user provided access token requesting application.

3. The apparatus as claimed in claim 1, wherein the apparatus is further configured to at least:
in response to the information provided by the user, change the access token of the second user provided access token requesting application to the different access token or to the different access token.

4. The apparatus as claimed in claim 1, wherein the second user provided access token requesting application is associated with a different source than the first user provided access token requesting application.

5. The apparatus as claimed in claim 1, wherein the apparatus is further configured to at least:

assign a verification key associated with the access token of the second user provided access token requesting application.

6. The apparatus as claimed in claim 1, wherein the apparatus is further configured to at least:
detect a presence of the second user provided access token requesting application.

7. The apparatus as claimed in claim 1, wherein the apparatus is further configured to at least:
detect, by a user provided access token management entity, a presence of the first user provided access token requesting application.

8. The apparatus as claimed in claim 1, wherein the first user provided access token requesting application and/or the second user provided access token requesting application is provided on a universal integrated circuit card, an integrated circuit, and/or an embedded integrated circuit.

9. The apparatus as claimed in claim 1, wherein the apparatus is further configured to at least download the second user provided access token requesting application.

10. The apparatus as claimed in claim 1, wherein the apparatus is further configured to receive a physical element carrying the second user provided access token requesting application.

11. The apparatus as claimed in claim 1, wherein the first user provided access token requesting application and/or the second user provided access token requesting application resides in a removable element.

12. The apparatus as claimed in claim 1, wherein the first user provided access token requesting application and/or the second user provided access token requesting application is provided on one or more of a subscriber identification module, a universal subscriber identification module, an internet protocol subscriber identification module, a code division multiple access subscriber identification module, and/or a removable user identity module.

13. The apparatus as claimed in claim 1, wherein the access token comprises a personal identification number and/or password.

14. The apparatus as claimed in claim 1, wherein the apparatus is further configured to at least request the information by displaying a visual message or playing an audible message.

15. The apparatus as claimed in claim 1, wherein the apparatus is further configured to at least:
store a third user provided access token requesting application, wherein the third user provided access token requesting application is associated with another existing access token; and
request, from the user of the apparatus, information that further indicates whether the access token of the second user provided access token requesting application is to be changed to other existing access token.

16. A computer program product comprising:
at least one computer readable non-transitory memory medium having program code stored thereon, the program code which when executed by an apparatus cause the apparatus to at least:
store, at a device, a first user provided access token requesting application, wherein the first user provided access token requesting application is associated with an existing access token;
receive, at the device, a second user provided access token requesting application;
request, from a user of the device, information indicative of whether an access token of the second user provided access token requesting application is to be changed to the existing access token or to different access token; and use the access token of the second user provided access token requesting application for verification, wherein the access token of the second user provided access token requesting application is changed, based on information provided by the user, to the existing access token or the different access token.

17. The computer program product as claimed in claim 16, further comprising:

storing, at the device, a third user provided access token requesting application, wherein the third user provided access token requesting application is associated with another existing access token; and requesting, from the user of the apparatus, information that further indicates whether the access token of the second user provided access token requesting application is to be changed to other existing access token.

18. A method comprising:

storing, at a device, a first user provided access token requesting application, wherein the first user provided access token requesting application is associated with an existing access token;

receiving, at the device, a second user provided access token requesting application;

requesting, from a user of the device, information indicative of whether an access token of the second user provided access token requesting application is to be changed to the existing access token or to different access token; and using the access token of the second user provided access token requesting application for verification, wherein the access token of the second user provided access token requesting application is changed, based on information provided by the user, to the existing access token or the different access token.

19. The method as claimed in claim 18, wherein the using includes accepting verification of the first user provided access token requesting application as verification of the second user provided access token requesting application.

20. The method as claimed in claim 18, further comprising:

in response to the information provided by the user, change the access token of the second user provided access token requesting application to the existing access token or to the different access token.

21. The method as claimed in claim 18, wherein the second user provided access token requesting application being associated with a different source than the first user provided access token requesting application.

22. The method as claimed in claim 18, further comprising:

storing, at the device, a third user provided access token requesting application, wherein the third user provided access token requesting application is associated with another existing access token; and requesting, from the user of the apparatus, information that further indicates whether the access token of the second user provided access token requesting application is to be changed to other existing access token.

* * * * *